US012585434B2

(12) United States Patent
Seo et al.

(10) Patent No.: US 12,585,434 B2
(45) Date of Patent: Mar. 24, 2026

(54) COMPUTING DEVICE WITH PIXEL UNSHUFFLE AND PIXEL SHUFFLE OPERATIONS AND COMPUTING METHOD THEREFOR

(71) Applicant: SAMSUNG ELECTRONICS CO., LTD., Suwon-si (KR)

(72) Inventors: Geonseok Seo, Suwon-si (KR); Nahyup Kang, Seoul (KR); Eunhee Kang, Yongin-si (KR); Byung In Yoo, Seoul (KR); Hyong Euk Lee, Suwon-si (KR); Jae Seok Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1067 days.

(21) Appl. No.: 17/678,339

(22) Filed: Feb. 23, 2022

(65) Prior Publication Data

US 2023/0092017 A1     Mar. 23, 2023

(30) Foreign Application Priority Data

Sep. 17, 2021    (KR) ........................ 10-2021-0124947

(51) Int. Cl.
| | |
|---|---|
| *G06F 7/76* | (2006.01) |
| *G06F 15/80* | (2006.01) |
| *G06N 3/04* | (2023.01) |

(52) U.S. Cl.
CPC ................ *G06F 7/76* (2013.01); *G06F 15/80* (2013.01); *G06N 3/04* (2013.01)

(58) Field of Classification Search
CPC ..................................... G06F 7/76; G06N 3/04
See application file for complete search history.

(56) References Cited

U.S. PATENT DOCUMENTS

| | | | |
|---|---|---|---|
| 2019/0095785 A1* | 3/2019 | Sarkar | ..................... G06N 20/00 |
| 2020/0258195 A1 | 8/2020 | Chuang et al. | |
| 2023/0196069 A1 | 6/2023 | Chen et al. | |

FOREIGN PATENT DOCUMENTS

| | | |
|---|---|---|
| CN | 111429350 A | 7/2020 |
| JP | 2017-107381 A | 6/2017 |
| KR | 10-2020-0100528 A | 8/2020 |
| KR | 10-2209526 B1 | 2/2021 |
| WO | WO 2021/080122 A1 | 4/2021 |

OTHER PUBLICATIONS

Song, Yuda, et al., "Automatical Enhancement and Denoising of Extremely Low-light Images." 2020 25th International Conference on Pattern Recognition (ICPR). IEEE, 2021., (3 pages).
Korean Office Action issued on Jun. 30, 2024, in counterpart Korean Patent Application No. 10-2021-0124947 (3 pages in English, 7 pages in Korean).

(Continued)

*Primary Examiner* — Michael D. Yaary
(74) *Attorney, Agent, or Firm* — NSIP Law

(57) ABSTRACT

A computing device and an operation method thereof are disclosed. The method includes unshuffling first image data to generate input data, generating output data by implementing a neural network (NN) model provided the input data, and generating second image data by shuffling the output data.

23 Claims, 10 Drawing Sheets

(56) References Cited

OTHER PUBLICATIONS

Cui, et al. "Color image restoration exploiting inter-channel corre-lation with a 3-stage CNN." *IEEE Journal of Selected Topics in Signal Processing* vol. 15 Issue Feb. 2, 2020: pp. 174-189.

Du, et al. "Orientation-aware deep neural network for real image super-resolution." *Proceedings of the IEEE/CVF Conference on Computer Vision and Pattern Recognition Workshops.* 2019. pp. 1944-1953.

Anwar, et al. "A deep journey into super-resolution: A survey." *ACM Computing Surveys (CSUR)* arXiv:1904.07523v3 [cs.CV] vol. 53 Issue 3 (Mar. 23, 2020): pp. 1-21.

Lee, et al. "Mobisr: Efficient on-device super-resolution through heterogeneous mobile processors." *The 25th Annual International Conference on Mobile Computing and Networking.* arXiv:1908.07985v1 [cs.CV] Aug. 21, 2019. pp. 1-16.

Liu, et al. "SplitSR: An end-to-end approach to super-resolution on mobile devices." *Proceedings of the ACM on Interactive, Mobile, Wearable and Ubiquitous Technologies.* arXiv:2101.07996v1 [cs.HC] vol. 5 Issue 1 (Jan. 20, 2021): pp. 1-20.

* cited by examiner

Input data 10

NN
20

Output data 30

101        Stride        102        100

| $X_{11}$ | $X_{12}$ | $X_{13}$ | $X_{14}$ | $X_{15}$ | $X_{16}$ |
| $X_{21}$ | $X_{22}$ | $X_{23}$ | $X_{24}$ | $X_{25}$ | $X_{26}$ |
| $X_{31}$ | $X_{32}$ | $X_{33}$ | $X_{34}$ | $X_{35}$ | $X_{36}$ |
| $X_{41}$ | $X_{42}$ | $X_{43}$ | $X_{44}$ | $X_{45}$ | $X_{46}$ |
| $X_{51}$ | $X_{52}$ | $X_{53}$ | $X_{54}$ | $X_{55}$ | $X_{56}$ |
| $X_{61}$ | $X_{62}$ | $X_{63}$ | $X_{64}$ | $X_{65}$ | $X_{66}$ |

X

Filter (n x n)        110

| $W_{11}$ | $W_{12}$ | $W_{13}$ |
| $W_{21}$ | $W_{22}$ | $W_{23}$ |
| $W_{31}$ | $W_{32}$ | $W_{33}$ |

=

120

| $Y_{11}$ | $Y_{12}$ | $Y_{13}$ | $Y_{14}$ |
| $Y_{21}$ | $Y_{22}$ | $Y_{23}$ | $Y_{24}$ |
| $Y_{31}$ | $Y_{32}$ | $Y_{33}$ | $Y_{34}$ |
| $Y_{41}$ | $Y_{42}$ | $Y_{43}$ | $Y_{44}$ |

200

300

Pixel unshuffle layer, shuffle ratio R = 3

COMPUTING DEVICE WITH PIXEL UNSHUFFLE AND PIXEL SHUFFLE OPERATIONS AND COMPUTING METHOD THEREFOR

CROSS-REFERENCE TO RELATED APPLICATIONS

This application claims the benefit under 35 USC § 119(a) of Korean Patent Application No. 10-2021-0124947, filed on Sep. 17, 2021, in the Korean Intellectual Property Office, the entire disclosure of which is incorporated herein by reference for all purposes.

BACKGROUND

1. Field

The following description relates to a computing device and method.

2. Description of Related Art

Unlike typical algorithm-based computer vision technology that may be implemented in devices, when deep learning approaches are utilized, such as for image processing, a lightweight model may be used to drive such deep learning approaches for processing images in a mobile device, e.g., compared to heavier models that may be utilized on devices with greater computational capabilities.

Typically, a deep learning model with a U-Net structure is utilized so a desired image processing, for example, may be implemented with various sized models, e.g., including a small sized model where a series of convolution operations with pooling are followed by a series of interpolation or deconvolution operations with up-sampling. However, though such interpolation or deconvolution operations with up-sampling may be used to increase a size of an image at the end, such interpolation or deconvolution operations with up-sampling are rather ineffective in terms of improving performance or decreasing the amount of computing, i.e., such operations may require increased computational capabilities and result in decreased performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes unshuffling first image data to generate input data, generating output data by implementing a neural network (NN) model provided the input data, and generating second image data by shuffling the output data.

The unshuffling may be performed by a first processor of a computing device, where the implementing of the NN model may be performed by a different second processor of the computing device.

The unshuffling may include converting, using the first processor, first image data in a first format into image data in a second format, and unshuffling, using the first processor, the image data in the second format.

The implementing of the NN model may be performed by a second processor of a computing device, where the shuffling may be performed by a different first processor of the computing device.

The method may further include receiving state data of a computing device that includes a first processor and a different second processor, perform the unshuffling using a selected, based on the state data, one of the first processor and the second processor.

The method may further include receiving state data of a computing device that includes a first processor and a different second processor, and performing the shuffling using a selected, based on the state data, one of the first processor and the second processor.

The first image data and the second image data may be of a same size.

The generating of the output data may include converting a first NN model, to the NN model, to be operable in a mobile computing device.

The unshuffling may be performed based on a shuffle ratio, and the shuffling may be performed based on the shuffle ratio.

In one general aspect, one or more embodiments include a non-transitory computer-readable storage medium storing instructions that, when executed by respective processors, cause the respective processors to perform one or more or all operations described herein.

In one general aspect, a processor-implemented method includes performing, using a first processor of a computing device, an unshuffle operation of a pixel unshuffle layer of a neural network (NN) model, performing, using the first processor, a shuffle operation of a pixel shuffle layer of the NN model, performing, using a second processor, a convolution operation of the NN model, where the convolution operation is performed in parallel with any one or any combination of the unshuffle operation and the shuffle operation.

The unshuffle operation may include converting first image data in a first format into image data in a second format.

Input data of the pixel unshuffle layer and output data of the pixel shuffle layer may be of a same size.

The method may further include converting a first NN model to a convolution NN model to be operable in the computing device, and to be configured to perform the convolution operation of the NN model.

The converting of the first NN model may further include adding the pixel unshuffle layer and the pixel shuffle layer to the convolution NN model, with a result of the converting being the NN model.

In one general aspect, a computing device includes a first processor configured to perform an unshuffle operation of a pixel unshuffle layer of a neural network (NN) model, and configured to perform a shuffle operation of a pixel shuffle layer of the NN model, a second processor configured to perform a convolution operation of the NN model dependent on a result of the pixel unshuffle layer, where a result of the pixel shuffle layer is dependent on a result of the convolution operation, and where the computing device is configured to perform the convolution operation in parallel with any one or any combination of the unshuffle operation and the shuffle operation.

For the unshuffle operation, the first processor may be configured to convert first image data in a first format into image data in a second format.

Input data of the pixel unshuffle layer and output data of the pixel shuffle layer may be of a same size.

The computing device may further include a memory storing instructions, which when executed by one or more processors of the computing device, configure one or more processors to convert a first NN model to a convolution NN model to be operable in the computing device, and to be configured to perform the convolution operation of the NN model.

The conversion of the first NN model may further include an addition of the pixel unshuffle layer and the pixel shuffle layer to the convolution NN model, with a result of the conversion being the NN model.

The unshuffle operation may be performed based on a shuffle ratio, and the shuffle operation may be performed based on the shuffle ratio.

The computing device may further include a memory storing instructions, which when executed by one or more processors of the computing device configures a select one of the first processor and the second processor to respectively perform the unshuffle operation of the pixel unshuffle layer and/or the shuffle operation of the pixel shuffle layer, and configures the second processor to perform the convolution operation.

Other features and aspects will be apparent from the following detailed description, the drawings, and the claims.

BRIEF DESCRIPTION OF THE DRAWINGS

FIGS. 9A and 9B illustrate example multi-operation methods, according to respective one or more embodiments.

Figures 1A, 1B:
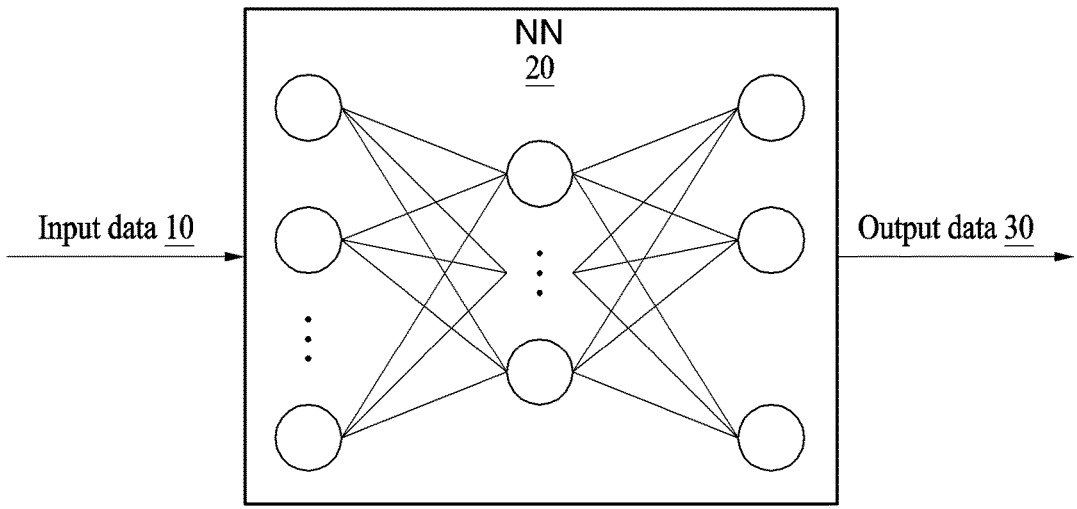
FIG. 1A illustrates an example of a deep learning method, according to one or more embodiments.
FIG. 1B illustrates an example convolution operation, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

FIG. 1A illustrates an example of a deep learning method, according to one or more embodiments.

An artificial intelligence (AI) approach including deep learning may provide input data 10 to a NN and learn output data 30 through an operation, for example, a convolution operation. The NN may be a computational architecture. In the NN, nodes connected to each other, e.g., through weighted connections, and collectively operate to process input data. Various types of neural networks may include, for example, a convolutional neural network (CNN), a recurrent neural network (RNN), a deep belief network (DBN), or a restricted Boltzmann machine (RBM), but are not limited thereto. In a feed-forward neural network, multiple nodes in one layer may have respective links to plural nodes in a next layer, for example. The links may be expanded in a single direction, for example, a forward direction, through the neural network.

Referring to FIG. 1A, an example of a structure in which the input data 10 is input to the NN and the output data 30 is output through the NN (e.g., a CNN 20) including one or more layers is illustrated. The NN may be, for example, a deep neural network (DNN) including at least two layers.

As an example, the CNN 20 may be used to extract "features," for example, a border, a line, and a color from the input data 10. The CNN 20 may include a plurality of layers. Each of the layers may receive data, process data that is input to a corresponding layer, and generate data that is to be output from the corresponding layer, e.g., to another layer. As an example, data output from a layer may be a feature map generated by performing a convolution operation on an image or a feature map that is input to the CNN 20 and weight values of at least one filter. As non-limiting examples, initial layers of the CNN 20 may operate to extract features of a relatively low level, for example, edges or gradients, from an input. As non-limiting examples, subsequent layers of the CNN 20 may gradually extract more complex features, for example, an eye or a nose in an image.

FIG. 1B illustrates an example convolution operation, according to one or more embodiments.

Referring to FIG. 1B, a process of performing a convolution operation in a NN may be a process of generating, in each layer, output values through a multiplication and addition operation between an input feature map 100 and a filter 110, and generating an output feature map 120 using a cumulative sum of the output values.

The process of performing the convolution operation may include performing multiplication and addition operations by applying a preset size, that is, an n×n size filter 110 to the input feature map 100 from an upper left to a lower right in a current layer. Hereinafter, a process of performing a convolution operation using a 3×3 filter 110 is described.

For example, firstly, an operation of multiplying 3×3 pieces of data in a first region 101 on the upper left side of the input feature map 100 by weight values W11 to W33 of the filter 110, respectively, is performed. Here, the 3×3 pieces of data in the first region 101 may be a total of nine pieces of data $X_{11}$ to $X_{33}$ including three pieces of data related to a first direction and three pieces of data related to a second direction. Thereafter, 1-1 output data $Y_{11}$ in the output feature map 120 may be generated using a cumulative sum of the output values of the multiplication operation, that is, $X_{11} \times W_{11}$, $X_{12} \times W_{12}$, $X_{13} \times W_{13}$, $X_{21} \times W_{21}$, $X_{22} \times W_{22}$, $X_{23} \times W_{23}$, $X_{31} \times W_{31}$, $X_{32} \times W_{32}$ and $X_{33} \times W_{33}$.

Thereafter, an operation may be performed whereby which unit(s) of data that are considered changed from the first region 101 to a second region 102 on the upper left side of the input feature map 100. In this example, the number of pieces of data shifted in this change with respect to the input feature map 100 for a convolution operation process is referred to as a stride, and a size of the output feature map 120 to be generated may be determined based on the stride. For example, when the stride is "1," an operation of multiplying a total of nine pieces of input data $X_{12}$ to $X_{34}$ included in the second region 102 by the weights $W_{11}$ to $W_{33}$ of the filter 110 may be performed, and 1-2 output data $Y_{12}$ in the output feature map 120 may be generated using a cumulative sum of the output values of the multiplication operation, that is, $X_{12} \times W_{11}$, $X_{13} \times W_{12}$, $X_{14} \times W_{13}$, $X_{22} \times W_{21}$, $X_{23} \times W_{22}$, $X_{24} \times W_{23}$, $X_{32} \times W_{31}$, $X_{33} \times W_{32}$, and $X_{34} \times W_{33}$.

Figure 2:
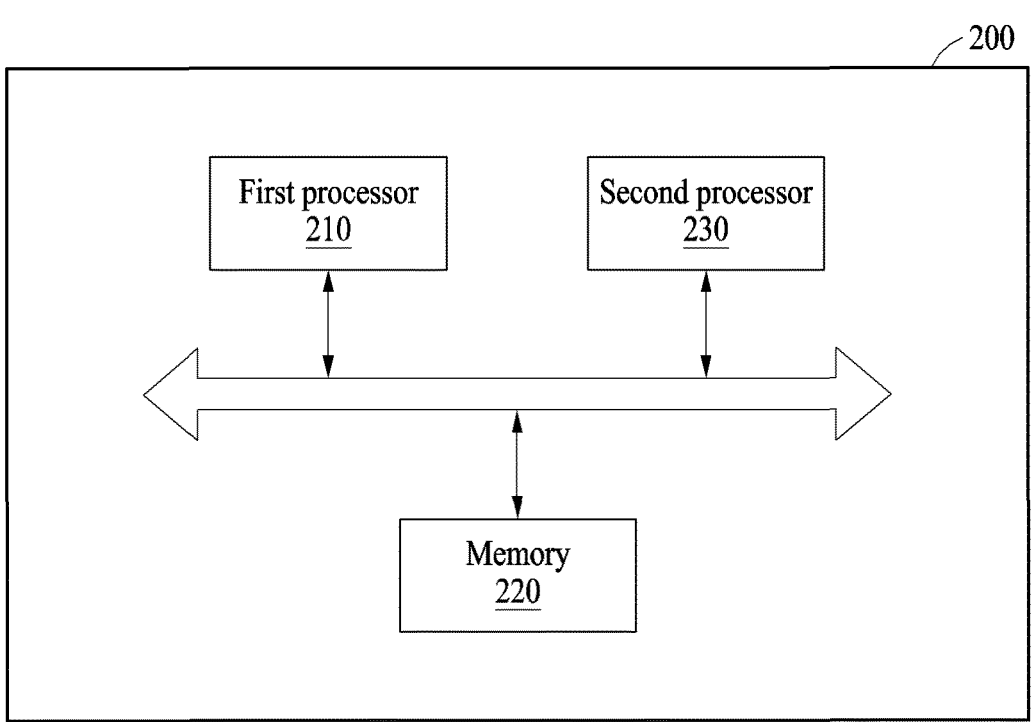
FIG. 2 illustrates an example computing device, according to one or more embodiments.

FIG. 2 illustrates an example computing device, according to one or more embodiments. Examples include the computing device being, or being included in, various types of device products or systems, for example, a personal computer (PC), a desktop computer, a laptop computer, a tablet computer, a smart phone, a wearable device, a television (TV), a smart home appliance or system, a security system, an intelligent vehicle, and a kiosk, noting that additional embodiments are also available.

Referring to FIG. 2, a computing device 200 may include a first processor 210, a second processor 230, and a memory 220, as non-limiting examples. The computing device 200 is also representative of other components, such as those remaining components of any of the example device product embodiments.

The first processor 210 may perform an overall function for controlling the computing device 200. The first processor 210 may generally control the computing device 200 by executing instructions stored in the memory 220 of the computing device 200, for example. For example, the memory 220 may store instructions, which when executed by the first processor 210, may configure the first processor 210 to perform one or more or all operations described herein with respect to operations of the first processor 210 example. The first processor 210 may be implemented as a central processing unit (CPU) provided in the computing device 200, but is not limited thereto.

The computing device 200 may include the second processor 230 configured to drive the neural network (NN) and/or to drive various machine learning models. The second processor 230 may correspond to, for example, a dedicated module for driving the NN, including a neural processing unit (NPU), a tensor processing unit (TPU), a neural engine, a graphics processing unit (GPU), and a digital signal processor (DSP), as non-limiting examples.

The memory 220 may be hardware for storing data processed in the computing device 200 and data to be processed. In addition, the memory 220 may store instructions, as well as applications, drivers, and the like to be driven by the computing device 200. As a non-limiting example, the memory 220 may store instructions, which when executed by the second processor 230, may configure the second processor 230 to perform one or more or all operations described herein with respect to operations of the second processor 230 example. As another example, the memory 220 may store one or more machine learning models, e.g., one or more NN models, that may be driven by the second processor 230, for example. The memory 220 may include at least one of a volatile memory (e.g., a dynamic random-access memory (DRAM)) or a non-volatile memory.

An example embodiment further includes multiple such device products that communicate with each other using a wireless communication circuit or through a communication interface, and where the example embodiment includes the first processor 210, the second processor 230, and the memory 220, among other components of the respective multiple device products.

As a non-limiting example, the computing device 200 may be a device that performs image processing in real time using a NN. As non-limiting examples, image processing may include various image processing approaches, including super resolution imaging, denoising, deblurring, high dynamic range (HDR) imaging, and motion blurring, again noting that examples are not limited thereto.

For example, the computing device 200 may be a smartphone and perform image processing on first image data (e.g., low-quality image data) obtained through a camera system of the smartphone in real time, and generate second image data (e.g., image data with an improved image quality).

However, typically real-time processing may not be readily performed in various devices, such as a mobile device, with deep learning models because an input size may be maintained until a final layer, and the deep learning model itself may be heavy, e.g., with many layers, nodes, and require significant computational resources.

Alternatively, deep learning approaches may be implemented using lightweight deep learning models, such as for image processing on mobile devices.

In addition, the example NN models may be converted such that the converted NN models are driven in the mobile device. For example, through a Qualcomm Snapdragon Neural Processing Engine (SNPE) software development kit (SDK), a NN model may be converted to a NN model to operate in Qualcomm devices, e.g., a trained deep learning model may be converted into a deep learning container (DLC) and be driven in a CPU, GPU, and DSP environment on a mobile device using the SNPE SDK. However, a layer that does not support the model transformation in an SNPE may not be convertible.

In one or more embodiments, the computing device 200 may divide operations for driving the deep learning model based on their characteristics to the first processor 210 and the second processor 230, e.g., for high-speed image processing in a mobile environment, and the operations may be processed simultaneously in parallel in each processor.

In addition, an example deep learning model may be configured for high-speed image processing, and may include a pixel unshuffle layer and a pixel shuffle layer, according to one or more embodiments.

Figure 3:
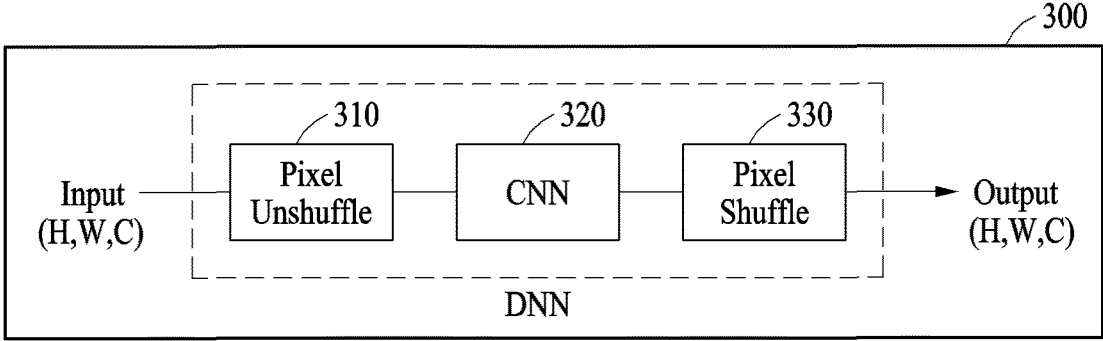
FIG. 3 illustrates an example deep learning model, according to one or more embodiments.

FIG. 3 illustrates an example deep learning model, according to one or more embodiments. The descriptions provided with reference to FIGS. 1A and 2 may also be applied to FIG. 3. Thus, a more detailed description of such operations are not repeated here, for brevity.

Referring to FIG. 3, a deep learning model 300 may include a pixel unshuffle layer 310, a NN model 320, and a pixel shuffle layer 330.

The deep learning model 300 may perform image processing on an input first image data (e.g., low-quality image data) in real time to generate an output second image data (e.g., image data with improved image quality).

That is, a computing device may provide the input first image data to the pixel unshuffle layer 310, and provide the result of the pixel unshuffle layer 310 to the NN model 320. The result of the NN model 320 may be provided to the pixel shuffle layer 330 to generate second image data. The second image data may be the final output data and may have the same size (e.g., a height H×a, width W×a, and number of channels C) as the input first image data.

Figure 4A:
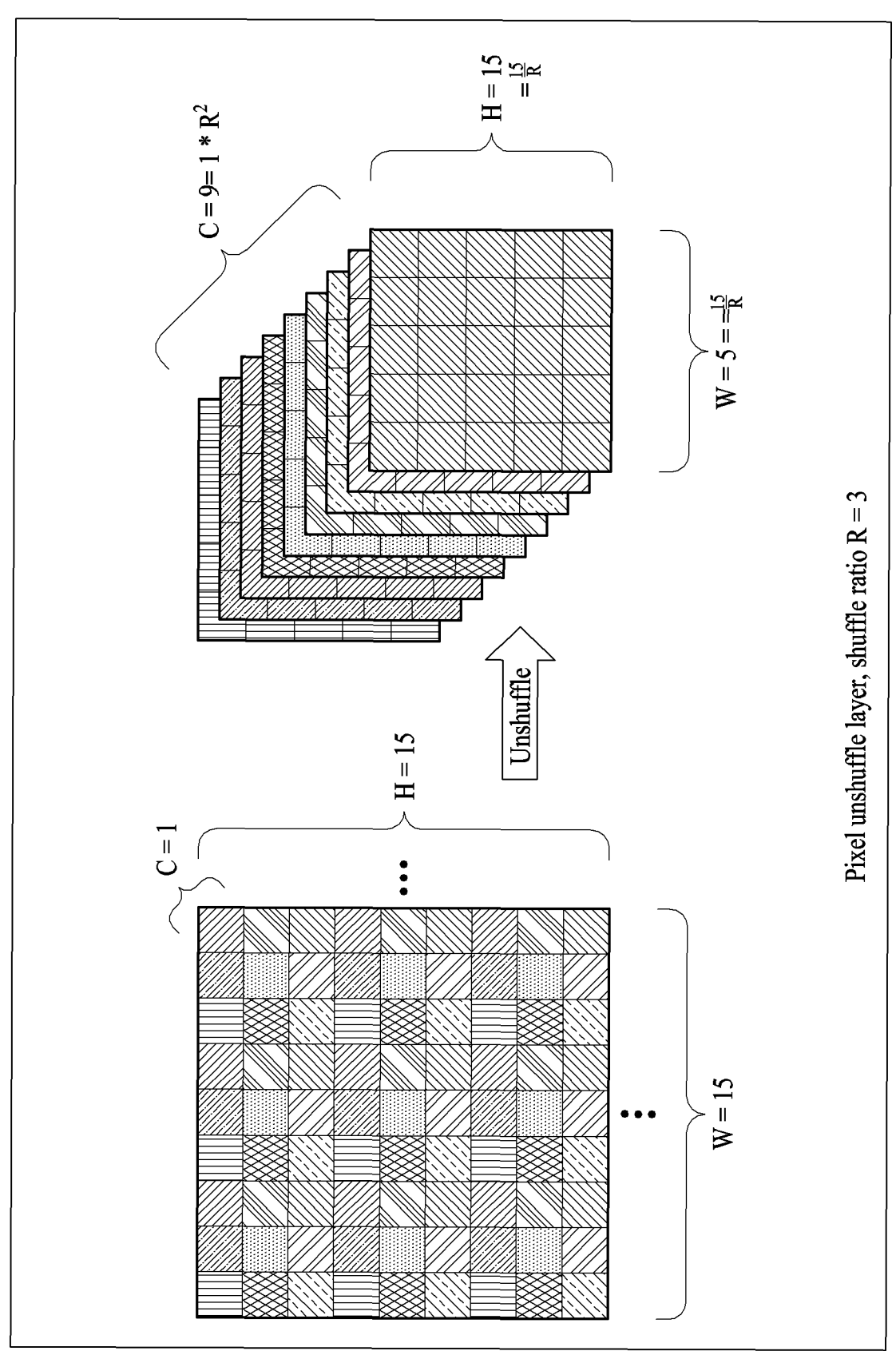
FIGS. 4A and 4B illustrate example respective operations of a pixel unshuffle layer and a pixel shuffle layer, according to one or more embodiments.
Figure 4B:
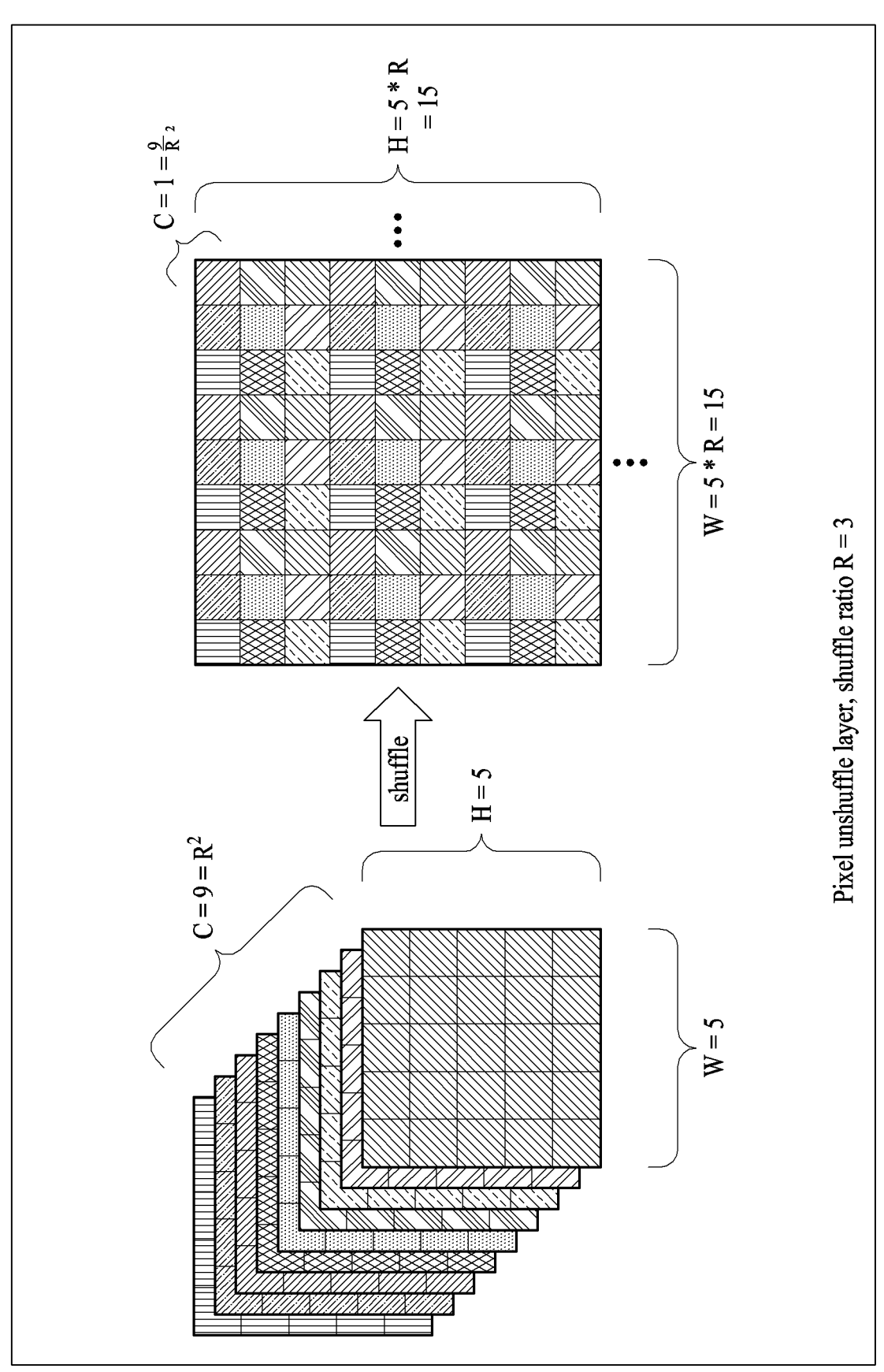

FIGS. 4A and 4B illustrate example respective operations of a pixel unshuffle layer and a pixel shuffle layer, according to one or more embodiments. The descriptions provided with reference to FIGS. 1A through 3 may also be applied to FIGS. 4A and 4B. Thus, more detailed descriptions of the same are not repeated here, for brevity.

Referring to FIG. 4A, a computing device may unshuffle first image data based on a shuffle ratio. That is, the computing device may input first image data having a size of $H \times w \times C$ to the pixel unshuffle layer 310 and obtain input data having a size of $H/r \times W/r \times C^*r^2$. Here, r denotes a shuffle ratio.

For example, the computing device may input first image data having a size of $15 \times 15 \times 1$ to the pixel unshuffle layer 310 and obtain input data having a size of $5 \times 5 \times 9$.

Referring to FIG. 4B, a computing device may shuffle output image data based on a shuffle ratio. That is, the computing device may input the first image data having a size of $H/r \times W/r \times C^*r^2$ to the pixel shuffle layer 330 and obtain input data having a size of $H \times W \times C$. Here, r denotes a shuffle ratio, e.g., the same shuffle ratio used in a pixel unshuffle layer.

For example, the computing device may input output data having a size of $5 \times 5 \times 9$ to the pixel shuffle layer 330 and obtain second image data having a size of $15 \times 15 \times 1$.

Figure 5A:
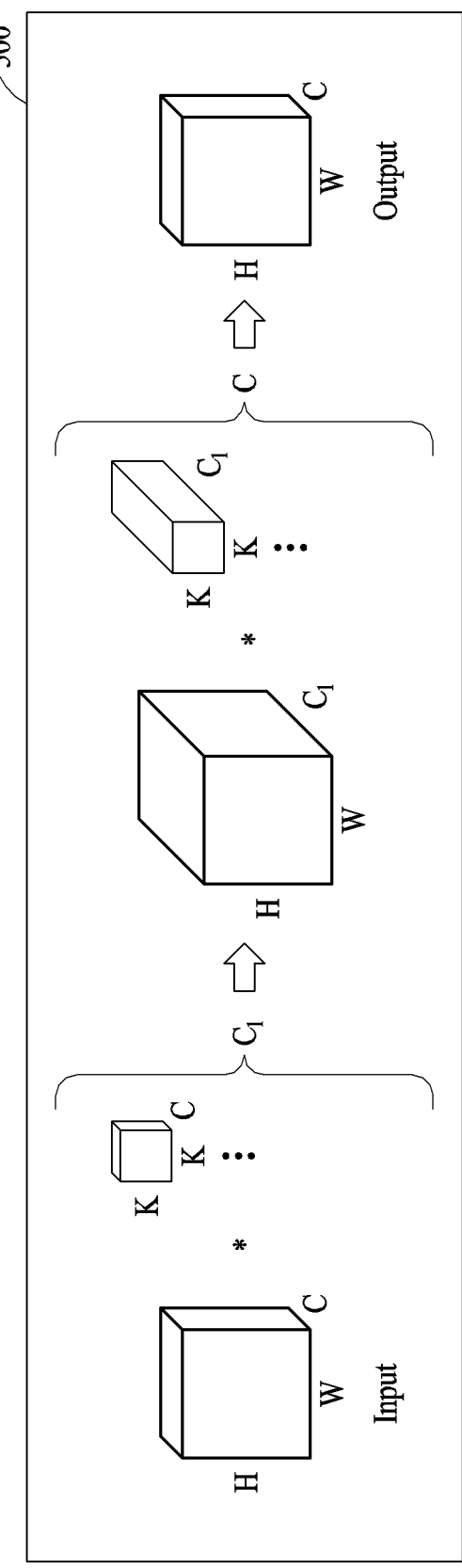
FIG. 5A illustrates operations of a deep learning model for image processing.
Figure 5B:
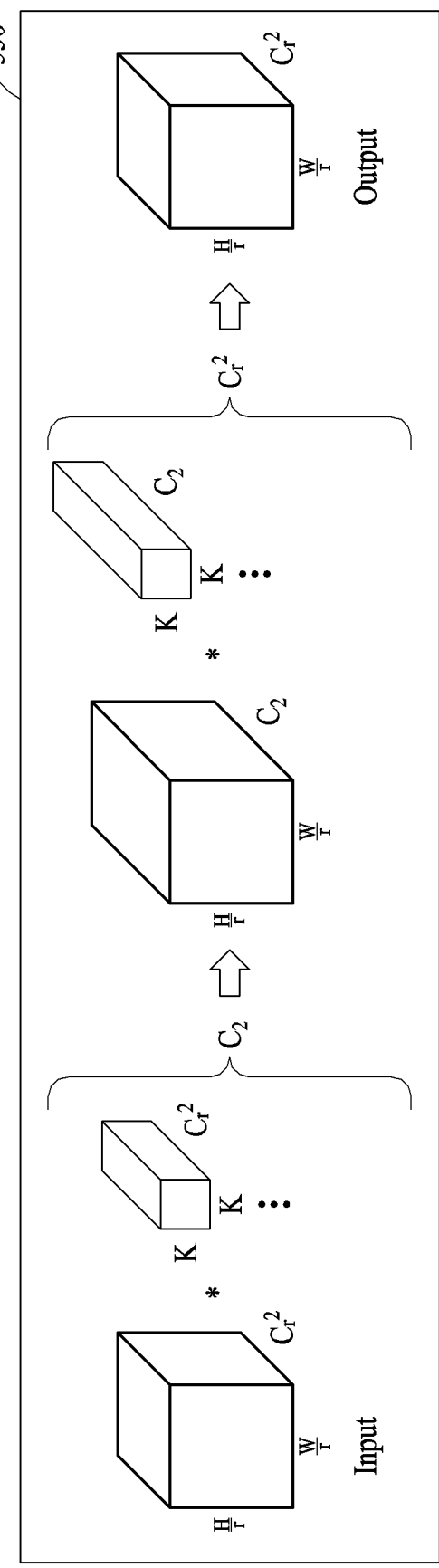
FIG. 5B illustrates example operations of a deep learning model for image processing, according to one or more embodiments.

FIG. 5A illustrates operations of a deep learning model for image processing, and FIG. 5B illustrates example operations of a deep learning model for image processing, according to one or more embodiments.

A floating-point operations per second (FLOPS) value, which represents the number of parameters forming a model and the number of addition and multiplication operations (a convolution operation), and a memory access cost may be standards that are frequently used to evaluate a computational amount of a deep learning model.

Before the operation method of the deep learning model for image processing is described, a general operation method of a typical deep learning model for image processing is described with reference to FIG. 5A.

Referring to FIG. 5A, the following is a description of a case of a typical deep learning model 500 for image processing. A size of input data and a size of output data of the general deep learning model 500 may be $H \times W \times C$, a size of a kernel may be K, and a convolutional neural network (CNN) having C1 channels in the middle may be present. In such case, it is assumed that the number of parameters of the deep learning model 500 may be $2K^2CC_1$, the number of FLOPS may be $2HWK^2CC_1$, and the number of memory access frequency may be $2(HW(C+C_1)+K^2CC_1)$.

Referring to FIG. 5B, a deep learning model 550 according to one or more embodiments may have a pixel unshuffle layer 310 and a pixel shuffle layer 330 at input and output ends of the NN model 320, and thus a size of the input data and the output data may become $H/r \times W/r \times C^*r2$, as described with reference to FIGS. 4A and 4B. When the size of a kernel is K and the number of layers is the same as the layers in the deep learning model 500 of FIG. 5A, the number of parameters of the deep learning model 550 may be $2K^2Cr^2C_2$, the number of FLOPS may be $2HWK^2CC_2$, and the number of memory access frequency may be $$2\left(\frac{HW}{r^2}(Cr^2 + C_2) + K^2Cr^2C_2\right).$$

Comparing the results of the deep learning model 500 and the results of the deep learning model 550 described with reference to FIGS. 5A and 5B, it is possible to derive a relationship of $$C_2 = \frac{C_1}{r^2} \text{ from } 2K^2 C C_1 = 2K^2 C r^2 C_2.$$

From this relationship, the number of FLOPS of the deep learning model 550 may be $$\frac{2HWK^2 C C_1}{r^2},$$

and the number of convolution operations may be reduced by $r^2$ in the deep learning model 550 compared to the deep learning model 500.

In addition, the memory access frequency of the deep learning model 550 may be $$2\left(\frac{HW}{r^2}(Cr^2 + C_2) + K^2 Cr^2 C_2\right) =$$
$$2\left(\frac{HW}{r^2}\left(Cr^2 + \frac{C_1}{r^2}\right) + K^2 Cr^2 \frac{C_1}{r^2}\right) = 2\left(HW\left(C + \frac{C_1}{r^4}\right) + K^2 C C_1\right).$$

Compared to the memory access frequency of the deep learning model 500, the deep learning model 550 may have a lower memory access frequency.

Figure 6:
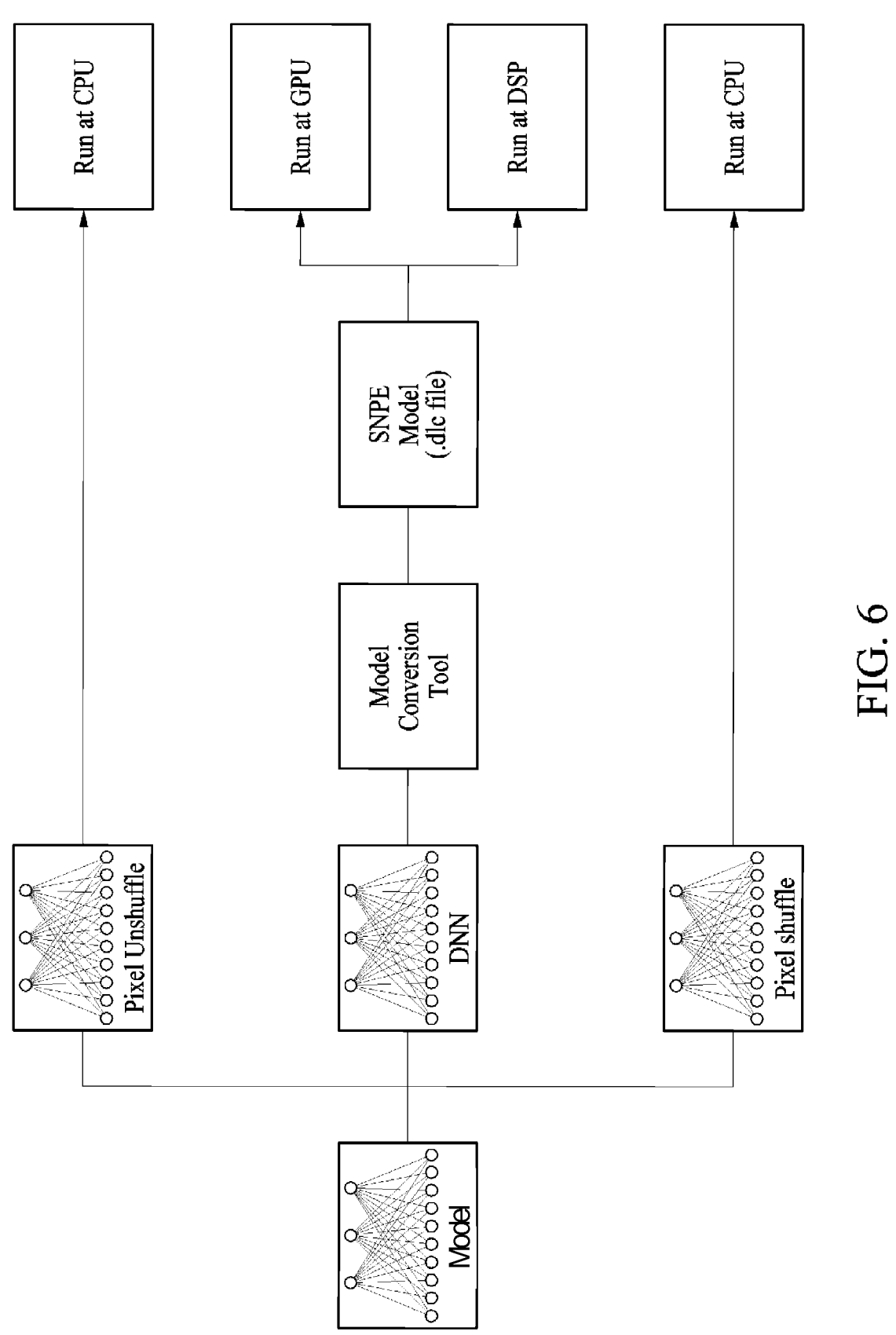
FIG. 6 illustrates an example method, according to one or more embodiments.

FIG. 6 illustrates an example method, according to one or more embodiments.

Referring to FIG. 6, an unshuffle operation of a pixel unshuffle layer and a shuffle operation of a pixel shuffle layer may be performed in a first processor of a computing device, and a convolution operation of a NN model may be performed in a second processor of the computing device. For example, the first processor may be the first processor 210 of FIG. 2, and the second processor may be the second processor 230 of FIG. 2, as non-limiting examples.

That is, the unshuffle operation and the shuffle operation may be operations for relocating a tensor of $$\left(H \times r, W \times r, \frac{C}{r^2}\right) \text{ to } (H \times W \times C),$$

and a tensor of $$(H \times W \times C) \text{ to } \left(H \times r, W \times r, \frac{C}{r^2}\right)$$

based on a set shuffle ratio. In an example, the unshuffle operation and the shuffle operation may perform a memory access and have different features than an addition operation (a convolution operation).

Generally, operations with a great number of memory accesses may be efficiently performed in the first processor (e.g., a CPU), and thus the unshuffle operation and the shuffle operation, which are operations for switching a position, may be also performed by the first processor (e.g., a CPU).

In an example, the unshuffle operation and the shuffle operation may be executed only twice, respectively at a start and an end of a deep learning model, and thus, the cost for exchanging a memory context may not be as great compared to the costs of exchanging memory contexts in a typical deep learning model such as the deep learning model 500 of FIG. 5A.

Thus, in one or more embodiments, a deep learning model for high-speed image processing proposed may be operated in parallel through a heterogeneous processor. Since the computing device does not need to be driven by the second processor (e.g., a GPU, a DSP, or an NPU), which is a processor for the convolution operation, a load of the processor may be reduced. Thus, one or more examples may provide a heterogeneous processor division driving approach of a deep learning model structure, such as with high-speed image processing in a mobile environment, as a non-limiting example.

As noted above, a model conversion tool (e.g., an SNPE SDK) that converts a NN model to be driven in a mobile device may not be able to convert or transform a layer of the NN model that the conversion tool does not support, but a computing device according to one or more embodiments may resolve such an issue by performing some operations in the first processor (e.g., a CPU) and some operations in the second processor (e.g. GPU, DSP, or NPU).

An internal NN model excluding a pixel unshuffle layer and a pixel shuffle layer may be a model conversion tool (e.g., an SNPE SDK) that converts a model to be operable in a mobile device (e.g., a Qualcomm device) into a deep learning container (DLC). Here, the pixel unshuffle layer and the pixel shuffle layer operating in the first processor (e.g., a CPU) may use a programming framework (e.g., an Android native development kit (NDK) Java native interface (JNI)) as a source code file (e.g., a C plus plus (CPP) file).

The computing device may build a written source code file (e.g., a CPP file) to generate a header file and a shared object library. In addition, a software program (e.g., an Android SDK) may be used to connect an inference layer of the second processor and an inference layer of the first processor. In a final stage, an SDK may be added to a mobile camera system and be completed as a mobile application.

For example, when a user obtains an image with a mobile camera, the image may be used as an input for a trained deep learning model according to one or more embodiments. The computing device may drive an image inferred from multiple devices in real time such that the user verifies the image using a mobile application in real time.

Figure 7A:
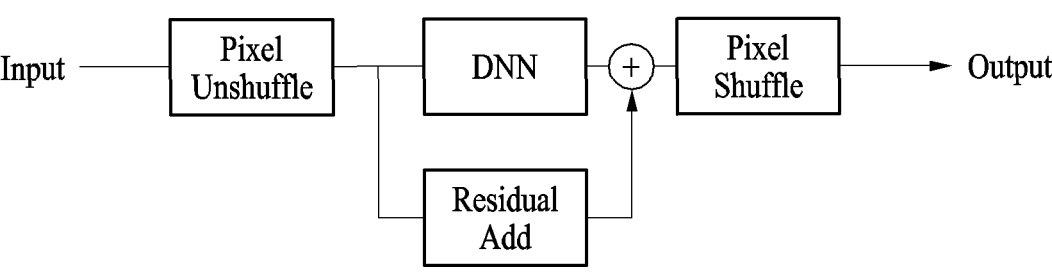
FIGS. 7A and 7B illustrate example deep learning models with residual connections are added, according to respective one or more embodiments.
Figure 7B:
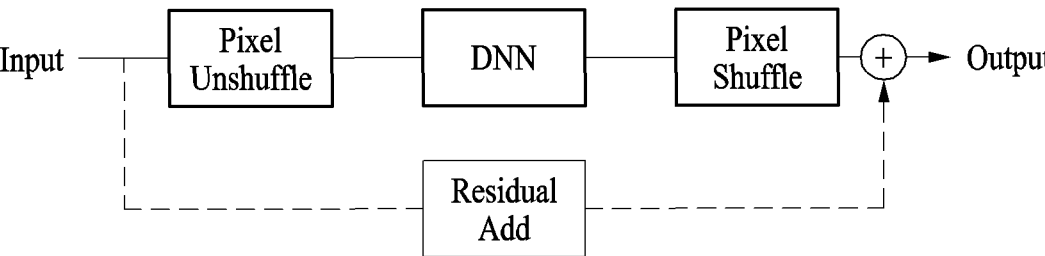

FIGS. 7A and 7B illustrate example deep learning models with residual connections, according to respective one or more embodiments.

Referring to FIG. 7A, a NN model may be configured to have a residual block.

Another residual block may be connected to the information learned from the previous layer through a residual connection (or a skip connection) and only learn and map information to be additionally learned in a layer.

Referring to FIG. 7B, a position of a residual connection may be changed. That is, a front end of a pixel unshuffle layer and a rear end of a pixel shuffle layer may be connected through the residual connection.

Figures 8A, 8B:
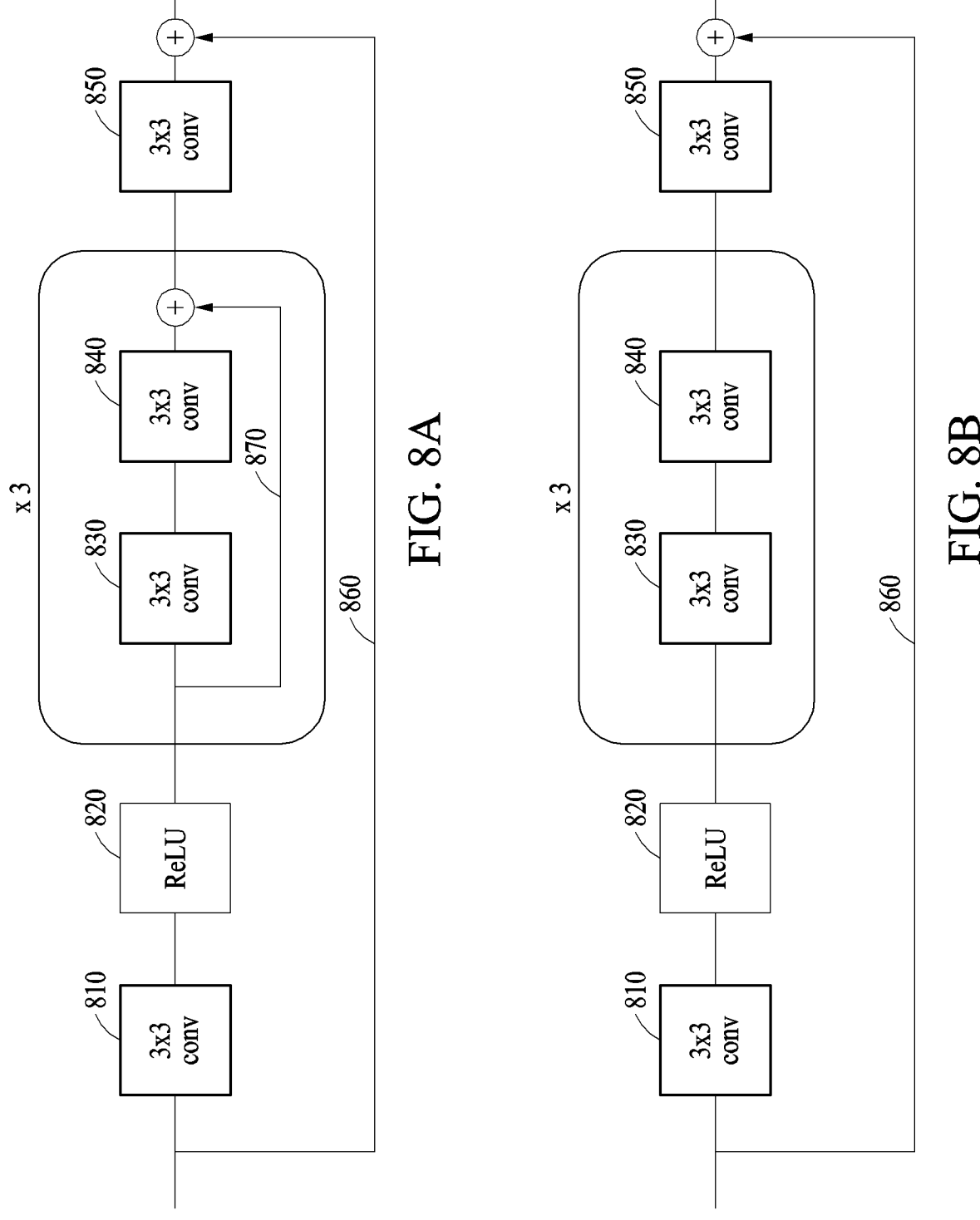
FIGS. 8A and 8B illustrate example NN models, according to respective one or more embodiments.

FIGS. 8A and 8B illustrate example NN models, according to respective one or more embodiments.

Referring to FIG. 8A, a residual block of the NN model may be a 3×3 convolution layer 810, a rectified linear unit (ReLU) layer 820, a 3×3 convolution layer 830, a 3×3 convolution layer 840 and 3×3 convolutional layer 850.

A first residual connection 860 may connect a front end of the 3×3 convolution layer 810 and a rear end of the 3×3 convolution layer 850, and a second residual connection 870 may connect a front end of the 3×3 convolution layer 830 and a rear end of the 3×3 convolution layer 850.

Referring to FIG. 8B, the second residual connection 870 may be omitted from a residual block of the NN model.

Figures 9A, 9B:
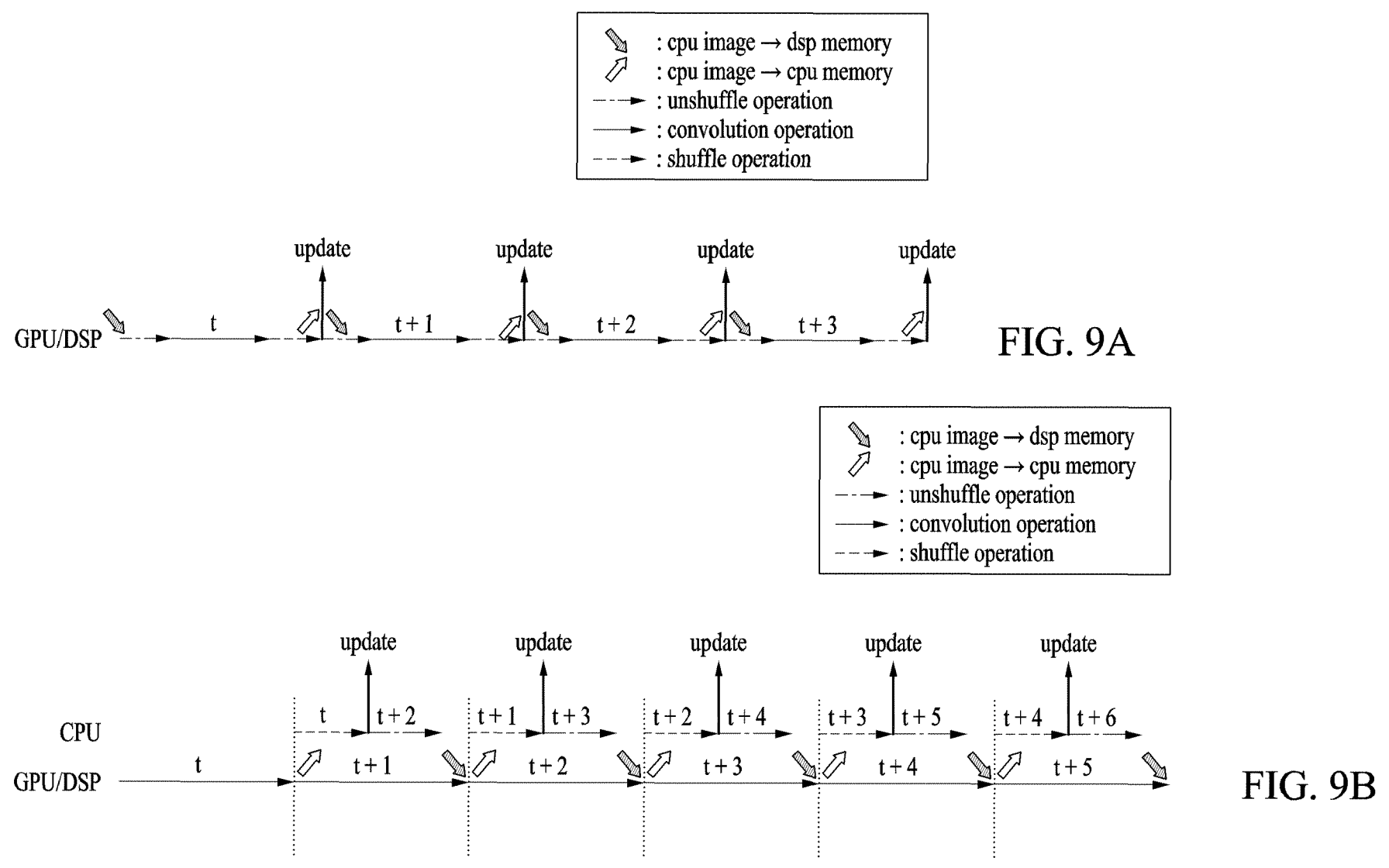

FIGS. 9A and 9B illustrate example multi-operation methods, according to respective one or more embodiments.

Before a multiple deep learning model operation method for image processing is described, a single deep learning model operation method for image processing is described with reference to FIG. 9A.

FIG. 9A illustrates a single operation method that performs an unshuffle operation, a shuffle operation, along with a convolution operation in a second processor (e.g., a GPU, a DSP, an NPU, etc.).

Compared to the multiple operation method illustrated in FIG. 9B, a computation speed may be slower, and a computing device may overheat when the single operation method is used.

For example, the second processor may receive first image data from the first processor (e.g., a CPU), perform an unshuffle operation, a convolution operation, and a shuffle operation to transmit second image data to the first processor. Thus, since the second processor performs all operations (e.g., the unshuffle operation, the convolution operation, and the shuffle operation), a load of only the second processor may be significantly increased.

Referring to FIG. 9B, a multiple operation method may determine a processor that performs an operation based on a feature of the operation to be driven in a mobile environment, and each processor may perform the operation in parallel.

A first processor may perform an unshuffle operation and a shuffle operation, and a second processor may perform a convolution operation when the first processor is performing any one or any combination of the unshuffle operation and the shuffle operation.

For example, when the first processor is performing the unshuffle operation on the first image data corresponding to t+2, the second processor may perform the convolution operation on input data corresponding to t+1 to transmit the output data to the first processor. When the first processor is performing a shuffle operation on the output data corresponding to t+1, the second processor may perform the convolution operation on the input data corresponding to t+2 to generate the output data to the first processor. The first processor may generate the second image data by performing the shuffle operation on the output data corresponding to t+2.

That is, when the first processor performs an unshuffle operation on first image data corresponding to i−1 and a shuffle operation on output data corresponding to i+1, the second processor may simultaneously perform the convolution operation for the output data corresponding to i. Since the convolution operation in the second processor and unshuffle and shuffle operation in the first processor operate simultaneously, an overall operation speed may be increased.

A computing device may determine subjects for an unshuffle operation and a shuffle operation based on state data. The state data may refer to information associated with a state of processors included in the computing device (e.g., an operation share ratio of each processor, heat generation data of the computing device, etc.).

The computing device may perform both the unshuffle operation and the shuffle operation in the second processor when the first processor is determined to have a higher share ratio, e.g., according to a predetermined threshold, than the second processor, or when the second processor has a higher share ratio, e.g., according to the or another predetermined threshold, than the first processor. When the second processor has the higher share ratio, the unshuffle operation and the shuffle operation may be performed by the first processor, and only the convolution operation may be performed by the second processor.

In addition, the first processor and the second processor may have different degrees of computing performance degradation based on heat generation. For example, the first processor may have a relatively greater degree of degradation in computing performance compared to the second processor. Thus, the computing device may determine the subjects for the unshuffle operation and the shuffle operation such that a degree of degradation of the overall operation performance of the computing device may be the lowest possible based on heat generation data, as a non-limiting example.

The apparatuses, processors, central processing units, neural processing units, tensor processing units neural engines, neural processing engines, graphics processing units, digital signal processors, memories, and computing devices, as well as other apparatuses, devices, modules, and components described herein with respect to FIGS. 1A through 9B are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A through 9B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, the method comprising:
   unshuffling first image data to generate input data;
   generating output data by implementing a neural network (NN) model provided the input data;
   generating second image data by shuffling the output data, and
   performing a convolution operation in parallel with one of the unshuffling of the first data and the shuffling of the output data.

2. The method of claim 1,
   wherein the unshuffling is performed by a first processor of a computing device,
   wherein the implementing of the NN model is performed by a different second processor of the computing device.

3. The method of claim 2, wherein the unshuffling comprises:
   converting, using the first processor, first image data in a first format into image data in a second format; and
   unshuffling, using the first processor, the image data in the second format.

4. The method of claim 1,
   wherein the implementing of the NN model is performed by a second processor of a computing device,
   wherein the shuffling is performed by a different first processor of the computing device.

5. The method of claim 1, further comprising:
   receiving state data of a computing device that includes a first processor and a different second processor; and performing the unshuffling using a selected, based on the state data, one of the first processor and the second processor.

6. The method of claim 1, further comprising:
receiving state data of a computing device that includes a first processor and a different second processor; and
performing the shuffling using a selected, based on the state data, one of the first processor and the second processor.

7. The method of claim 1, wherein the first image data and the second image data are of a same size.

8. The method of claim 1, wherein the generating of the output data comprises:
converting a first NN model, to the NN model, to be operable in a mobile computing device.

9. The method of claim 1,
wherein the unshuffling is performed based on a shuffle ratio, and
wherein the shuffling is performed based on the shuffle ratio.

10. A non-transitory computer-readable storage medium storing instructions that, when executed by respective processors, cause the respective processors to perform the method of claim 1.

11. A processor-implemented method, the method comprising:
performing, using a first processor of a computing device, an unshuffle operation of a pixel unshuffle layer of a neural network (NN) model;
performing, using the first processor, a shuffle operation of a pixel shuffle layer of the NN model; and
performing, using a second processor, a convolution operation of the NN model,
wherein the convolution operation is performed in parallel with any one or any combination of the unshuffle operation and the shuffle operation.

12. The method of claim 11, wherein the unshuffle operation includes converting first image data in a first format into image data in a second format.

13. The method of claim 11, wherein input data of the pixel unshuffle layer and output data of the pixel shuffle layer are of a same size.

14. The method of claim 11, further comprising:
converting a first NN model to a convolution NN model to be operable in the computing device, and to be configured to perform the convolution operation of the NN model.

15. The method of claim 14, wherein the converting of the first NN model further comprises adding the pixel unshuffle layer and the pixel shuffle layer to the convolution NN model, with a result of the converting being the NN model.

16. A non-transitory computer-readable storage medium storing instructions that, when executed by respective processors, cause the respective processors to perform the method of claim 11.

17. A computing device, the computing device comprising:
a first processor configured to perform an unshuffle operation of a pixel unshuffle layer of a neural network (NN) model, and configured to perform a shuffle operation of a pixel shuffle layer of the NN model; and
a second processor configured to perform a convolution operation of the NN model dependent on a result of the pixel unshuffle layer,
wherein a result of the pixel shuffle layer is dependent on a result of the convolution operation, and
wherein the computing device is configured to perform the convolution operation in parallel with any one or any combination of the unshuffle operation and the shuffle operation.

18. The computing device of claim 17, wherein, for the unshuffle operation, the first processor is configured to convert first image data in a first format into image data in a second format.

19. The computing device of claim 17, wherein input data of the pixel unshuffle layer and output data of the pixel shuffle layer are of a same size.

20. The computing device of claim 17, further comprising a memory storing instructions, which when executed by one or more processors of the computing device, configure one or more processors to convert a first NN model to a convolution NN model to be operable in the computing device, and to be configured to perform the convolution operation of the NN model.

21. The computing device of claim 20, wherein the conversion of the first NN model further comprises additions of the pixel unshuffle layer and the pixel shuffle layer to the convolution NN model, with a result of the conversion being the NN model.

22. The computing device of claim 17, wherein the unshuffle operation is performed based on a shuffle ratio, and the shuffle operation is performed based on the shuffle ratio.

23. The computing device of claim 17, further comprising a memory storing instructions, which when executed by one or more processors of the computing device configures a select one of the first processor and the second processor to respectively perform the unshuffle operation of the pixel unshuffle layer and/or the shuffle operation of the pixel shuffle layer, and configures the second processor to perform the convolution operation.

* * * * *